Figure 1:
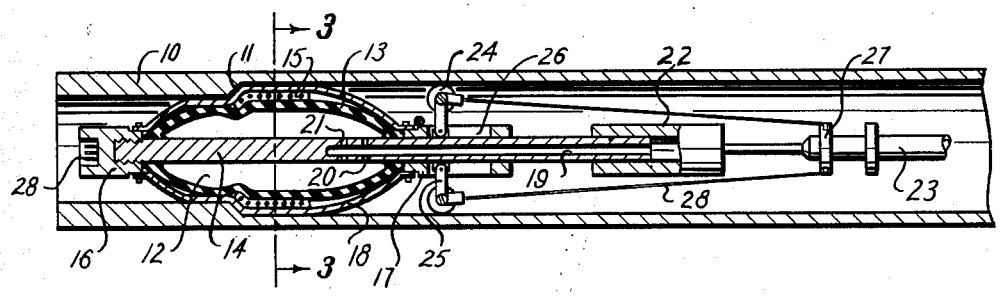

Dec. 16, 1952     J. C. BENDER     2,622,125
EXPANSIBLE COIL FOR TESTING MATERIAL
Filed Sept. 20, 1948

John C. Bender
INVENTOR.

BY James F. Weiler

ATTORNEY

Patented Dec. 16, 1952

2,622,125

UNITED STATES PATENT OFFICE 2,622,125

EXPANSIBLE COIL FOR TESTING MATERIAL

John C. Bender, Houston, Tex., assignor to Houston Oil Field Material Company, Inc., Houston, Tex., a corporation of Delaware Application September 20, 1948, Serial No. 50,123

9 Claims. (Cl. 175—183)

1

This invention relates to the testing of materials to determine variations or defects therein and relates more particularly to a means to test materials of irregular internal contour.

There are many and numerous methods and apparatus for the testing of materials to determine variations or defects therein. One of these methods consists of maintaining a sustained oscillation of resonant frequency in an oscillatory circuit and successively electromagnetically coupling different small portions of the material being tested with the circuit whereby changes in the electrical characteristics of the material being tested due to defects or variations therein produce changes in this frequency. These changes may be indicated in many ways such as by sonic or visual means. Such a means and method is disclosed in the patent to Dana, No. 1,984,465, issued December 18, 1934, as applied to electrical conductors.

The above method and further and similar ones in the art have not been used in testing materials of irregular internal contour due to the difficulty in securing satisfactory results in that an exploratory coil inserted into internal contours of irregular configuration is limited in size by the minimum orifice therein and does not effectively electromagnetically couple successive portions of the material being tested.

It is among the objects of my invention to provide a means to produce a radio frequency electromagnetic field with the axis and at right angles to the axis of the material being tested.

It is a further object to provide a means to produce a magnetic field which will conform to and follow the path of the irregular internal contour of the material being tested so that defects or variations in the material will produce changes in an oscillatory circuit maintained at resonant frequency so that such frequency may be heterodyned with a current from an oscillating generator of constant frequency in order that the changes in beat frequency therebetween may be observed.

It is a particular object to provide an exploratory coil which will effectively and efficiently electromagnetically couple successive portions of ferrous or non-ferrous pipe, such as internal upset pipe.

It is a particular and further object to provide an exploratory coil which may be effectively and efficiently used in electric, electromagnetic or electronic methods of inspecting ferrous or non-ferrous material for defects, flaws or variations.

A feature of the invention is the provision of

2 an exploratory coil which will conform to the internal contour of the material being tested.

In my co-pending application filed September 20, 1948, bearing Serial Number 50,124, I have disclosed and claimed a different means to accomplish the above objects.

Figure 2:
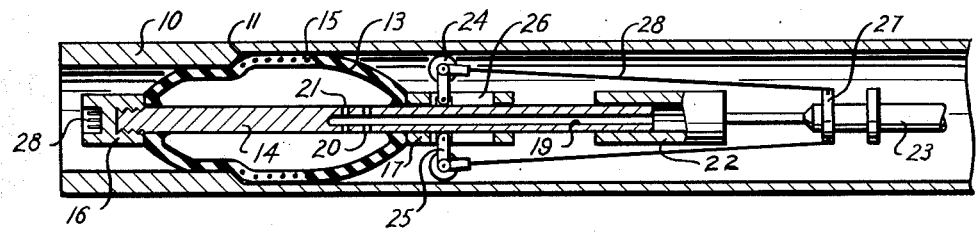
Figure 3:
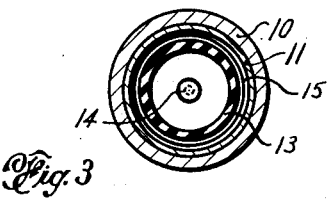

Other objects and advantages are apparent from the following description of a preferred embodiment of my invention taken in conjunction with the accompanying drawing wherein like reference numerals designate like parts throughout both views, and where Figure 1 is a longitudinal, cross-sectional view of my testing device illustrating the use thereof in testing internal upset pipe, Figure 2 is similar to Figure 1 and illustrates a modification of my testing device, and Figure 3 is a cross-sectional view of my testing device taken along the line 3—3 of Figure 1.

Referring to Figure 1 of the drawing the numeral 10 designates the pipe to be tested which is internally upset at 11. The testing unit, generally designated as 12 is inserted and withdrawn in a deflated position.

My testing device comprises an inflatable bladder or body member 13 made of a suitable and flexible material such as rubber which may be inflated after the device is inserted beyond the restricted pipe joint in order that the bladder will yieldingly conform to the internal configuration of pipe 10. Bladder 13 is connected to a central member 14 and a winding or coil 15 is disposed about the former.

A nose piece 16 is threaded to one end of central member 14 and a guide wheel support 17 is disposed about the central portion of member 14 adjacent bladder 13. A plurality of straps 18, made of leather or any suitable material, are connected to elements 16 and 17 and extend longitudinally of bladder 13 and limit the extent to which the latter may be inflated. These straps further give strength to the bladder and, if desired, coil 15 may be attached thereto and the straps may be waxed to aid in the movement of the device through the pipe.

Central body member 14 has a longitudinal passage 19 which communicates with the interior of bladder 13 by means of ports 20 and 21. Central passage 19 continues through tubular member 22 connected to member 14 and on through handle 23. A hand pump may be inserted into the end of handle 23 to inflate bladder 13. Centering wheels 24 are retractably connected to member 17 by arms 25 pivoted to the latter which is recessed at 26 to receive wheels 24. Such wheels may be retracted by manipulating bearing member 27 which is connected to wheels 24 by rods 28.

In operation my testing device may be inserted into an internally upset pipe 10 with bladder 13 deflated and guide wheels 24 in retracted position. The bladder 13 will readily compress and the testing device may be easily passed through the narrower opening at the joint. After the bladder 13 is inside the upset portion 11 of pipe 10 a hand pump may be attached to handle 23 and the bladder inflated to bring coil 15 in close proximity with the inner walls of the upset portion 11 of pipe 10. Guide wheels 24 may be moved into centering position by manipulation of bearing 27 and the device may be easily urged through the pipe by means of a cord or rod not shown.

Assuming that my testing device is connected by means of electrical connection 28 to an electronic circuit, the coil 15 will set up a radio frequency electromagnetic field as it is moved inside pipe 10 in close proximity to the internal walls thereof and any variations or defects will produce changes in the frequency in the oscillatory circuit to which the coil is connected thereby producing changes in the frequency of such circuit which may be indicated to the operator by suitable means. If desired, a light may be provided on my testing device, and a telescope may be attached to handle 23 in order that the operator may visually inspect the flaws, variations or defects indicated by the coil and associated circuits and indicating means.

A modification of my inflatable testing device is illustrated in Figure 2. In this modification the bladder 13 is formed of a suitable flexible material such as leather and the coil 15 may be disposed in this material rather than outside thereof or on the straps 18 is illustrated in Figure 1. All other parts are similar to the testing device illustrated in Figure 1 and the mode of operation is the same.

Many modifications in details and substitution of parts and materials may be made in my inflatable testing device. Varying and additional means may be used to center my coil inside a material to be tested. In testing materials having circular passages, flexible connections or knuckle joints may be employed and by obvious modification my coil may be used to detect variations, defects or flaws in materials having internal passages of varying configuration. By changing the shape of the expansible member, surfaces of varying or flat shape may be tested and it seems obvious that my testing device is more efficient when used in materials having consistent internal passages than those of the prior art.

I claim:

1. A device for finding variations and flaws in materials comprising an inflatable body member adapted to be inflated into contact with irregular internal passages in said materials and means disposed about said member to produce a magnetic field whereby eddy currents may be produced in said materials and the energy absorbed by said eddy currents may be indicated.

2. A device for finding variations and flaws in materials comprising an inflatable body member adapted to be inflated into contact with irregular internal passages in said materials and a coil about said member to produce a magnetic field whereby eddy currents may be produced in said materials and the energy absorbed by said eddy currents may be indicated.

3. A device for exploring internal passages in materials comprising an inflatable body member adapted to be expanded into contact with said internal passages, and a coil disposed about said body member to inductively couple successive small portions of said materials to a testing circuit as said device is moved along said internal passage.

4. A device for testing for flaws in hollow bodies comprising a body member inflatable into contact with the inner walls of said hollow bodies, a coil about said body member and means to manipulate said body member in said hollow portion.

5. A device for detecting flaws in pipe comprising, a bladder-like body member formed of flexible material and adapted to be expanded into contact with the internal walls of said pipe, a plurality of straps adapted to limit the expansion of said body member and a coil disposed about said body member and adapted to set up a magnetic field in said pipe as said device is urged therethrough.

6. A device for detecting flaws in a pipe comprising, a bladder type body member of flexible material adapted to be expanded into engagement with the inner walls of sad pipe and a coil disposed axially about said body member adapted to electromagnetically couple successive sections of said pipe to a testing circuit.

7. An inductive means adapted for use with an oscillatory circuit of the type supplied with energy of resonant frequency by an electron tube and used for detecting defects in materials comprising, a rubber bladder adapted to be expanded into engagement with the inner walls of said materials, and a coil about said bladder whereby said coil is maintained in maximum inductive realtionship to said inner walls.

8. An inductive means adapted for use with an oscillatory circuit of the type supplied with energy of resonant frequency by an electron tube and used for detecting defects in internal upset pipe comprising, a rubber bladder adapted to be expanded into engagement with the inner walls of said upset pipe, and means disposed about said bladder to successively electromagnetically couple small portions of said pipe and set up eddy currents therein whereby the means to successively electromagnetically couple small portions of said pipe is maintained in maximum inductive relationship thereto.

9. A device for detecting flaws in pipe comprising an expansible body member adapted to be expanded into contact with the surface of a material to be tested and a coil about said body member to produce a magnetic field whereby eddy currents may be produced in said material and variations therein indicated.

JOHN C. BENDER.

REFERENCES CITED

The following references are of record in the file of this patent:

UNITED STATES PATENTS

| Number | Name | Date |
| --- | --- | --- |
| 2,041,058 | Fossati | May 19, 1936 |
| 2,118,852 | McDonnell | May 31, 1938 |
| 2,124,579 | Knerr et al. | July 26, 1938 |
| 2,216,600 | Moore | Oct. 1, 1940 |
| 2,218,155 | Rulser et al. | Oct. 15, 1940 |
| 2,427,950 | Doll | Sept. 23, 1947 |